United States Patent
Eu et al.

(10) Patent No.: US 8,406,187 B2
(45) Date of Patent: Mar. 26, 2013

(54) DYNAMIC BANDWIDTH ALLOCATION SYSTEM OF WIBRO/WIMAX COMMUNICATION

(75) Inventors: Jai Hong Eu, Seoul (KR); Chi Suk Chong, Seoul (KR); Byung Sic Hwang, Seoul (KR)

(73) Assignee: Jcastnetworks Korea, Inc., Gyeonggi-Do (KR)

( * ) Notice: Subject to any disclaimer, the term of this patent is extended or adjusted under 35 U.S.C. 154(b) by 198 days.

(21) Appl. No.: 12/742,406

(22) PCT Filed: Jun. 25, 2008

(86) PCT No.: PCT/KR2008/003641
§ 371 (c)(1),
(2), (4) Date: May 11, 2010

(87) PCT Pub. No.: WO2009/082071
PCT Pub. Date: Jul. 2, 2009

(65) Prior Publication Data
US 2011/0110313 A1 May 12, 2011

(30) Foreign Application Priority Data
Dec. 20, 2007 (KR) ........................ 10-2007-0134318

(51) Int. Cl.
*H04W 4/00* (2009.01)
(52) U.S. Cl. ........................................................ 370/329
(58) Field of Classification Search .......... 370/310–350, 370/206–208, 210
See application file for complete search history.

(56) References Cited

U.S. PATENT DOCUMENTS

| | | | |
|---|---|---|---|
| 6,363,262 B1 * | 3/2002 | McNicol | 455/561 |
| 7,154,996 B2 | 12/2006 | Strauss | |
| 2001/0001617 A1 * | 5/2001 | Koga et al. | 375/347 |
| 2007/0183591 A1 | 8/2007 | Geile et al. | |
| 2008/0279290 A1 * | 11/2008 | Radpour | 375/260 |
| 2010/0105315 A1 * | 4/2010 | Albrett | 455/3.04 |

OTHER PUBLICATIONS

Locher, M. Tomesen et al., "A Low Power, High Performance BiCMOS MIMO/Diversity Direct Conversion Transceiver IC for WiBro/WiMAX (802.16e)", Custom Integrated Circuits Conference, 2007. CICC '07. IEEE, Sep. 16-19, 2007, pp. 101-105. (cited on Intl Search Report).
Association Technology Consortium Jun. 12, 2007.

* cited by examiner

*Primary Examiner* — Andrew Chriss
*Assistant Examiner* — Kenan Cehic
(74) *Attorney, Agent, or Firm* — Rabin & Berdo, P.C.

(57) ABSTRACT

Provided is a WiBro/WiMAX dynamic bandwidth allocation system. The dynamic bandwidth allocation system according to the present invention enables instant band change and allocation in variable channel environment by disposing a plurality of BPFs each having a different pass band and selectively using the BPFs in order to dynamically allocate bands according to an occupancy state of a current channel detected around a system. Therefore, the transmission quality can be improved.

6 Claims, 3 Drawing Sheets

DYNAMIC BANDWIDTH ALLOCATION SYSTEM OF WIBRO/WIMAX COMMUNICATION

TECHNICAL FIELD

The present invention relates to a dynamic bandwidth allocation system of wireless broadband (WiBro)/worldwide interoperability for microwave access (WiMAX) communication and, more particularly, to a dynamic bandwidth allocation system of WiBro/WiMAX communication for dynamically allocating a bandwidth according to a current channel occupancy state detected around an installation location of a WiBro/WiMAX communication system.

BACKGROUND ART

Lately, a wireless broadband (WiBro) mobile internet business begins in earnest. Accordingly, the introduction of WiBro/WiMAX systems has been actively promoted in various domestic companies.

In order to hold a dominant position on technology negotiation and exporting against foreign equipment, the WiBro/WiMAX system must have a specialized functional module that provides distinguishable features and advantages.

Conventionally, a fixed bandwidth was allocated to transmit and receive information. Therefore, it was impossible to dynamically change a bandwidth according to a channel state around a system.

If communication quality deteriorates or communication was interrupted due to interference of peripheral channels, it was required to replace a filter after disassembling a device or a device is replaced with another device which was designed to operate in a different bandwidth because it was impossible to change a bandwidth instantly. That is, such a replacement operation was annoying and time consumption operation. Furthermore, the replacement process became a factor that deteriorates the service quality and increases the dissatisfaction of customers because the replacement process interrupts communication for a comparative long time.

DISCLOSURE OF INVENTION

Technical Problem

An embodiment of the present invention is directed to providing a dynamic bandwidth allocation system of WiBro/WiMAX communication for enabling instant bandwidth change and bandwidth allocation in a wireless environment and sustaining and improving a transmission quality by disposing a plurality of band pass filters (BPF) each having a different pass band and selectively using the plurality of BPFs in order to dynamically allocating bandwidth according to an occupancy state of a current channel, which is detected around the system.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided a dynamic bandwidth allocation system of wireless broadband (WiBro)/worldwide interoperability for microwave access (WiMAX). The dynamic bandwidth allocation system includes an antenna for receiving channel signals sensed at an installation location of the dynamic bandwidth allocation system before providing a service of transmitting predetermined information, a frequency converter for performing frequency down conversion on the channel signals from the antenna using a local oscillator that operates in a WiMAX transmission band, a band pass filter unit having a plurality of band pass filters each having a different frequency passband for passing the channel signals from the frequency converter, a signal converter for performing analog to digital conversion on the channel signals from the band pass filter unit, a switch unit for controlling the plurality of band pass filters to select one of the plurality of band pass filters in order to pass the channel signals only through the selected one of the plurality of band pass filters, and a processor for searching an available frequency band which is not occupied by the channel signals by analyzing the channel signal from the signal converter, and controlling the switch unit to transmit and receive the information through an optimal band pass filter that is a band pass selected from the plurality of band pass filters, which can pass the available frequency band.

The processor may include a channel information update unit for storing a frequency band and a signal intensity of a channel signal in a data table if an intensity of the channel signal from the selected band pass filter is larger than a predetermined threshold, and a switch controller for searching the available frequency band based on the channel signal stored in the database of the channel information update unit, and controlling the switch unit to transmit and receive information only through the optimal band pass filter.

The processor may further include a sampling clock selector for changing a sampling clock of the signal converter corresponding to a passband of the optimal band pass filter at the same time of controlling the switch unit in order to transmit and receive the information after sampling the information by the sampling clock corresponding to the passband of the optimal band pass filter.

The processor may further include an oscillation frequency controller for changing an oscillation frequency of the local oscillator by a predetermined frequency interval where the predetermined frequency interval is a bandwidth of a minimum band pass filter which is a band pass filter having a narrowest passband among the plurality of band pass filter, the channel information update unit may store frequency bands and signal intensities of channel signals detected at the predetermined frequency interval in the data table, and the switch controller may search the available frequency band with reference to all of the channel signals stored in the data table of the channel information update unit.

The switch controller may control the switch unit to receive the channel signal only through the minimum band pass filter while receiving the channel signals.

The switch controller may transmit command information to the signal converter to drive the optimal band pass filter only. The signal converter may perform digital to analog conversion (DAC) on the command information and transmits the converted command information to the BPF unit, the band pass filter unit may transmit the command information to the frequency converter through the selected band pass filter, and the frequency converter may convert the command information to a WiMAX transmission band through frequency up conversion using the local oscillator and transmits the converted command information to the antenna. The antenna wirelessly may transmit the command information to a client system at a remote location, where the client system includes the antenna, the frequency converter, the BPF unit, the switch unit, the signal converter, and the processor, and the processor of the client system may control the switch unit and the signal converter of the client system to transmit and receive the information only through the optimal band pass filter corresponding to the command information.

Advantageous Effects

A dynamic bandwidth allocation system of WiBro/WiMAX communication according to the present invention provide following effects.

At first, the dynamic bandwidth allocation system according to the present invention enables instant band change and allocation in variable channel environment by disposing a plurality of BPFs each having a different pass band and selectively using the BPFs in order to dynamically allocate bands according to an occupancy state of a current channel detected around a system. Therefore, the transmission quality can be improved.

Secondly, the dynamic bandwidth allocation system according to the present invention can perform dynamic band allocation that guarantees maximum efficiency and also can be applied to both of a stationary system and a mobile system by replacing a control module for fixed bandwidth allocation with a control module for dynamic bandwidth allocation, for example, a plurality of band pass filters (BPF). Therefore, it is more convenient to produce and to maintain a related device due to digitalized control mechanism.

Third, a dynamic band allocation board part can be applied to all fields of a wireless communication system as well as a WiBro relay network system and a WiBro/WiMAX system. Therefore, it is expected that the dynamic bandwidth allocation system according to the present invention will take the lead as competitive equipment and will be widely exported as equipment having superior features against foreign equipment.

BEST MODE FOR CARRYING OUT THE INVENTION

The advantages, features and aspects of the invention will become apparent from the following description of the embodiments with reference to the accompanying drawings, which is set forth hereinafter. Terms and words used in specification and claims must not be understood as typical or dictionary meaning only. Terms and words may be understood as meanings and concepts corresponding to technical aspects of the present invention based on the principle that inventors may properly define concepts of terms in order to describe own invention with the best method.

Therefore, embodiments described in specification and configurations shown in accompanying drawings are only an embodiment of the present invention. Since the embodiments and the configurations may not represent all of technical aspects of the present invention, there may be various equivalents and modifications which can replace the embodiments and the configuration at a time of filing a related application.

Figure 1:
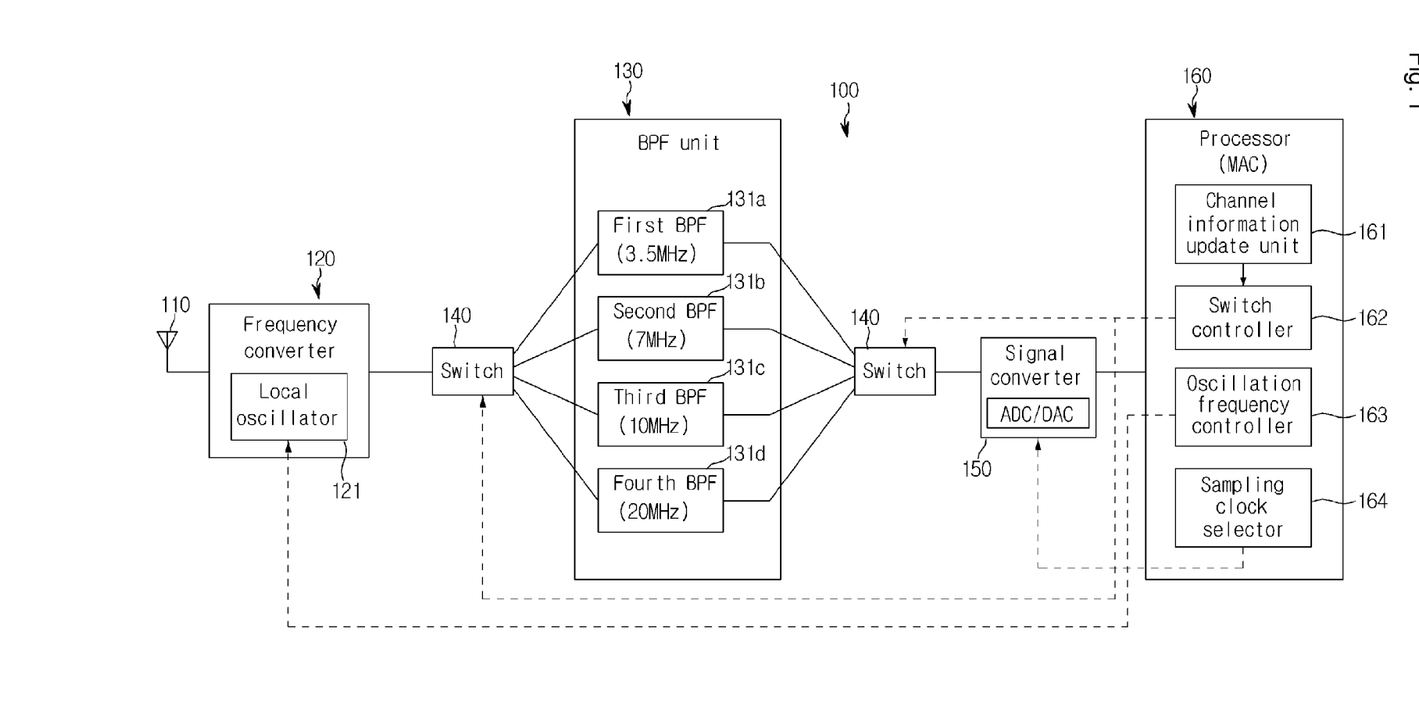
FIG. 1 is a diagram illustrating a dynamic bandwidth allocation system of WiBro/WiMAX in accordance with an embodiment of the present invention.
Figure 2:
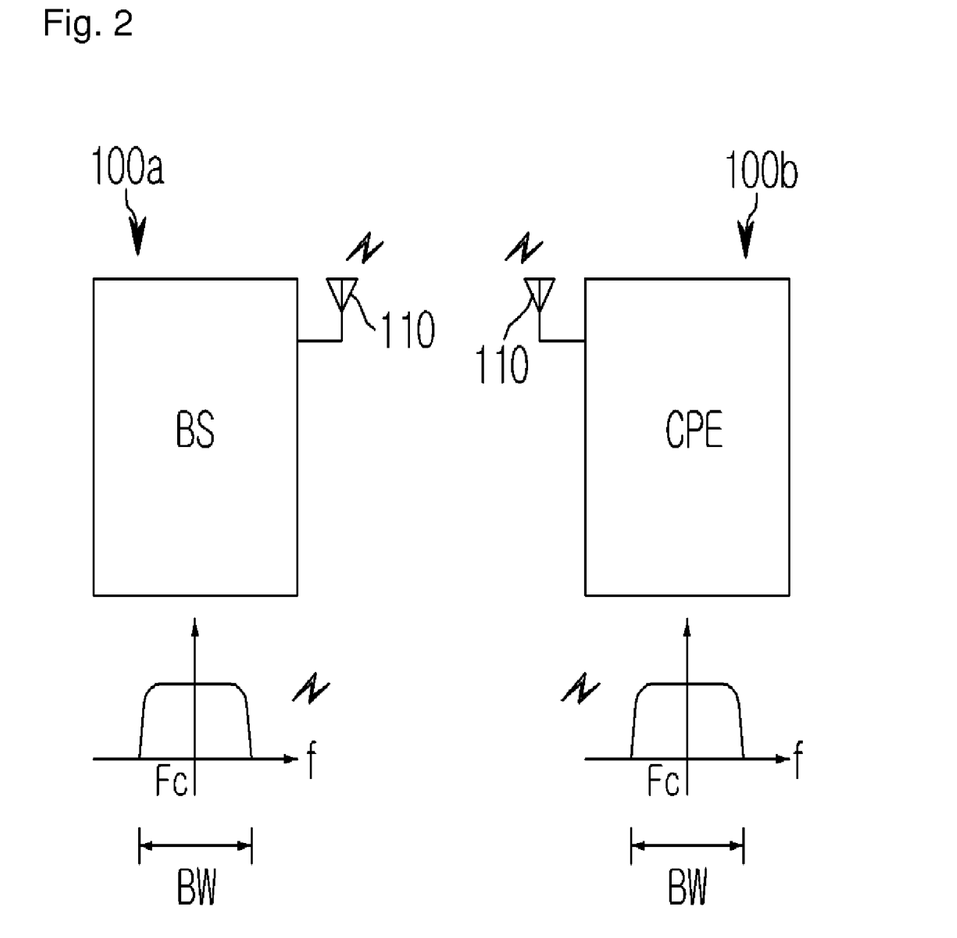
FIG. 2 is a diagram illustrating communication between a system and a client system of FIG. 1.
Figure 3:
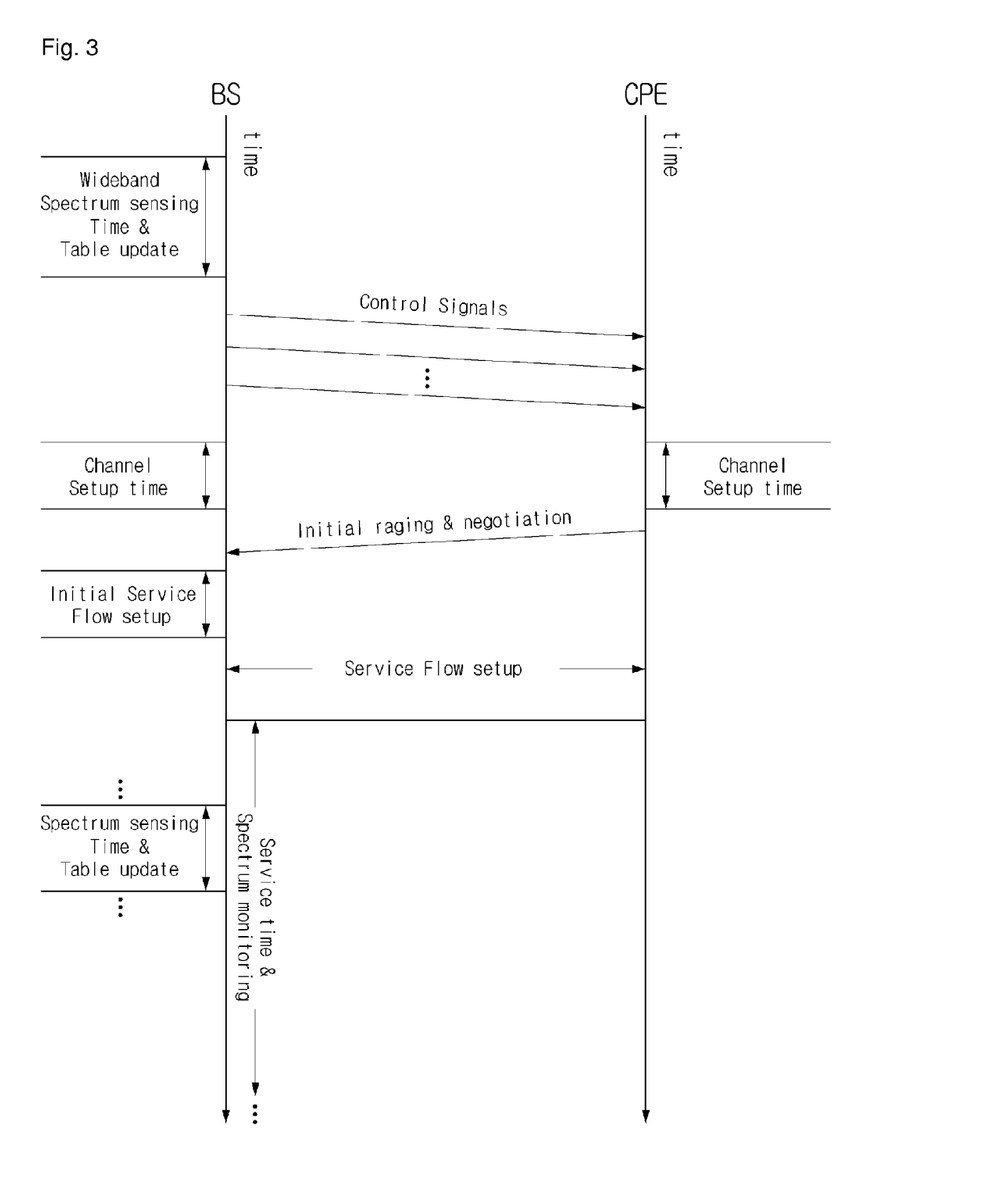
FIG. 3 is a flowchart illustrating a dynamic bandwidth allocation method between a system and a client system of FIG. 2.

FIG. 1 is a diagram illustrating a dynamic bandwidth allocation system of WiBro/WiMAX in accordance with an embodiment of the present invention. FIG. 2 is a diagram illustrating communication between a system and a client system of FIG. 1. FIG. 3 is a flowchart illustrating a dynamic bandwidth allocation method between a system and a client system of FIG. 2.

Worldwide interoperability for Microwave Access (WiMAX) (IEEE 802.16d) is a communication technology for providing a high speed wireless multimedia communication service using a bandwidth of 5.8 GHz. The WiMAX expands a wireless communication service to a wideband network from a short distance wireless communication. The WiMAX effectively provides dynamic services by cooperating with various wired or wireless communication networks.

Since the WiMAX technology enables long distance transmission up to a distance of 120 km and realizes a transmit rate of maximum 40 Mbps in both of a stationary state and a mobile state, the WiMAX technology advantageously enables mass data transmission. That is, a large amount of various sensor data including audio and video data can be transmitted at once using the WiMAX technology. Therefore, the WiMAX technology can be used as a method of high speed long distance transmission. Due to such an advantage thereof, the WiMAX technology can be also used for an emergency rescue operation to quickly transmit information.

Hereinafter, a WiBro/WiMAX dynamic bandwidth allocation system 100 according to an embodiment of the present invention will be described with reference to FIGS. 1 to 3.

As shown in FIG. 1, the dynamic bandwidth allocation system 100 includes an antenna 110, a frequency converter 120, a band pass filter (BPF) unit 130, switches 140, a signal converter 150, and a processor 160.

The dynamic bandwidth allocation system 100 according to the present embodiment may be a base station (BS) 100*a* or customer premise equipment (CPE) 100*b* that receives a service from the base station. For convenience, the dynamic bandwidth allocation system 100 according to the present embodiment will be described based on the BS 100*a*.

The antenna 100 receives channel signals that are sensed at the installation location of the dynamic bandwidth allocation system 100 before the dynamic bandwidth allocation system 100 provides a predetermined service.

For example, the BS 100*a* detects the channel signals around the installation location of the current base station 100*a* before the BS 100*a* performs a service that transmits predetermined information to the CPE 100*b*. That is, the BS 100*a* detects a channel occupancy state of other signals.

If the BS 100*a* detects a channel signal that occupies a channel (bandwidth) for transmitting the predetermined information, the service may not be properly performed because the predetermined information may be distorted by the channel signal.

Therefore, the BS 100*a* according to the present embodiment detects a channel occupancy state of a current installation location based on the received channel signal before transmitting the predetermined information to the CPE 100*b*, while the transmission or the reception of signals is interrupted, or at a time of not transmitting information). Based on the detected channel occupancy state, the dynamic bandwidth allocation system 100 according to the present invention searches an available channel which is not occupied by the channel signals and transmits/receives the information using the available channel, thereby enabling dynamic bandwidth allocation.

The frequency converter 120 is connected to the antenna 110. The frequency converter 120 down-converts a frequency of the received channel signal from the antenna 110 using a local oscillator 121 which operates in a WiMAX transmission band.

The WiMAX transmission band is about 5.8 GHz. Particularly, the WiMAX transmission band is in a range of 5.725 to 5.825 GHz. Here, the local oscillator 121 performs oscillation at a frequency selected from the range of 5.727 GHz to 5.825 GHz.

Meanwhile, the BPF unit 130 includes a plurality of band pass filters 131a to 131d.

Each of the band pass filters 131a to 131d has a different frequency passband. The band pass filters 131a to 131d are disposed in parallel to each others. One of the band pass filters (BPFs) 131a to 131d is selected in response to the control of the switches 140 and a signal is transmitted only through a path of the selected BPF. That is, the selected one of the BPFs 131a to 131d passes the down converted channel signal from the frequency converter 120.

The BPFs 131a to 131d may be designed to have a bandwidth of 3.5 MHz, 7 MHz, 10 MHz, and 20 MHz, respectively. These bandwidths are general WiMAX transmission bandwidths. For example, a first BPF 131a, a second BPF 131d, a third BPF 131c, and a fourth BPF 131d may be designed to have a bandwidth of 500 KHz to 3.5 MHz, a bandwidth of 500 KHz to 7 MHz, a bandwidth of 500 KMz to 10 MHz, and a bandwidth of 500 KHz to 20 MHz, respectively.

However, the bandwidths of BPFs 131a to 131d according to the present invention are not limited thereto. Also, the number of the BPFs 131a to 131d is not limited to 4.

The signal converter 150 is disposed at the rear end of the BPF unit 130. The signal converter 150 receives the channel signal from the BPF unit 130 and converts the channel signal from an analog signal to a digital signal.

Here, the switches 140 may be disposed at the both ends of the BPF unit 130 for limiting the signal transfer paths of BPF 131a to 131d.

The switches 140 control the BPF unit 131 to pass the channel signal only through the selected one of the plurality of BPFs 131a to 131d.

In more detail, as shown in FIG. 1, the switches 140 are disposed at the both ends of the BPF unit 130 and switch each path of individual BPF 131a to 131d according to the control of the processor 160. That is, the switches 140 open a path of the selected BPF and close the paths of the other BPFs among the plurality of BPFs 131a to 131d in the BPF unit 131.

Accordingly, it is preferable to change a sampling clock of the signal converter 150 performing the ADC conversion to a sampling clock corresponding to the selected BPF. The sampling clock can be changed through the control of the processor 160.

The processor 160 simultaneously controls the switching operation of the switches 140 and changes the sampling clock of the signal converter 150 to transmit information only through the selected frequency bandwidth, which is not occupied by the channel signal, by analyzing the occupied bandwidth of the channel signal from the signal converter 150. The processor 160 may be a media access control (MAC) based processor.

In more detail, the processor 160 analyzes the channel signal transmitted from the signal converter 150, searches an available frequency band which is not occupied by the channel signal based on the analyzing result, and controls the switching operation of the switches 140 to transmit and receive the information only through a BPF selected from the plurality of BPFs 131a to 131d, which can pass the searched available frequency band.

For example, the available frequency band may be a bandwidth lower than 16.2 MHz (=(5.8081-5.8000) GHz×2) when an oscillation frequency of the local oscillator 121 operates based on a channel of 5.8000 GHz and the channel signal disturbing transmission of information is detected around 5.8081 GHz.

Here, a BPF that can perform the transmission of the available frequency band among the plurality of BPFs 131a to 131d is one of the first BPF 131a (bandwidth of 3.5 MHZ), the second BPF 131d (bandwidth of 7 MHz), and the third BPF 131c (bandwidth of 10 MHz) except the fourth BPF 131d (bandwidth of 20 MHz).

After the processor 160 completely analyzes the channel occupancy state, the processor 160 simultaneously controls the switching operation of the switches 140 and controls the sampling clock of the signal converter 150 in order to transmit and receive the information only through the optimal BPF which is a BPF selected from the first to third BPF 131a to 131c.

It is preferable to select the optimal BPF in consideration of power consumption and the efficiency of a signal process although the optimal BPF can be selected randomly. For example, in case of selecting the third BPF 131c among the first to third BPFs 131a to 131c, a transmit rate may increase and a time for transmitting and receiving information may be shortened because the third BPF 131c has the maximum bandwidth. However, an amount of processing a signal and power consumption of the signal converter 150 may disadvantageously increase. In case of selecting the first BPF 131a, it is possible to advantageously simplify a signal process and to reduce power consumption although a time of transmitting and receiving information disadvantageously increases.

Hereinafter, a dynamic bandwidth allocation operation of the dynamic bandwidth allocation system 100 according to an embodiment of the present invention will be described.

The processor 160 includes a channel information update unit 161, a switch controller 162, an oscillation frequency controller 163, and a sampling clock selector 1645 for the dynamic band allocation operation.

The channel information update unit 161 stores a frequency band and a signal intensity of a corresponding channel signal at a data table if the intensity of the channel signal from the selected BPF is larger than a predetermined threshold.

The data table is a database for storing frequency bands and signal intensities updated by the received channel signal. The data table is used as reference for dynamic band allocation.

Here, if a channel signal has signal intensity lower than the predetermined threshold, the signal intensity thereof is very small compared to target information to transmit by the BS 100a. That is, the channel signal having the signal intensity lower than the predetermined threshold is equivalent to a signal lower than a noise level that does not influence transmitting and receiving the information. Therefore, if the channel signal having the signal intensity lower than the predetermined threshold is received, the information of the channel signal can be excluded from the target information to store in the table data.

The switch controller 162 searches an available frequency band which is not occupied by a corresponding channel signal with reference to the corresponding channel signal stored in the data table of the channel information update unit 161 and controls the switches 140 to transmit and receiving information through the optimal BPF.

After completely detecting the channel occupancy state using the data table, the switch controller 162 opens only a path of the optimal BPF and closes paths of all other BPFs in order to transmit and receive the information only through the optimal BPF which is a BPF selected from the BPFs 131a to 131d.

While the switches 140 are performing the control operation, the sampling clock selector 164 simultaneously changes the sampling clock of the signal converter 150 to a passband of the optimal BPF in order to sample the information corresponding to the sampling clock based on the passband of the optimal BPF and transmit the sampled information.

Meanwhile, the oscillation frequency controller 163 changes and controls the oscillation frequency of the location oscillator 121 at a predetermined frequency interval when the channel signal is received through the antenna 110.

In more detail, the oscillation frequency controller 163 detects all of channel signals in target frequencies for transmitting information by changing passbands at a predetermined interval which is about a bandwidth of a BPF having the minimum band, for example, the first BPF 131a. Therefore, the dynamic bandwidth allocation is performed in consideration of all of channel signals.

Here, the switch controller 162 controls the switches 140 to receive the channel signal only through the minimum band BPF 131a among the BPFs in the BPF unit 130 while the channel signal is receiving through the antenna 110.

Although it is possible to use a BPF having further wider bandwidth than the minimum band BPF 131a when channel information is received through the oscillation frequency control, it is difficult to accurately detect which frequency band is occupied by which channel signal when channel signals are distributed in the wideband. Also, the inaccurate detection of channel occupancy state deteriorates efficiency of the dynamic band allocation or causes communication malfunction to transmit/receive information. Therefore, it is important to accurately detect a frequency band having a target channel signal using a BPF having the narrowest passband in order to improve the reliability and efficiency of dynamic bandwidth allocation.

For example, the oscillation frequency controller 163 operates as follows. When a bandwidth of the BS 100a is 20 MHz bandwidth from 5.8 GHz as the center thereof, the oscillation frequency controller 163 sequentially controls the oscillation frequency of the location oscillator 121 at as much as a bandwidth (3.5 MHz) of the first BPF 131a which is the BPF having the narrowest passband in FIG. 1.

That is, the oscillation frequency controller 163 sequentially controls the oscillation frequency of the local oscillator 121 at an interval of 3.5 MHz in a range of 5.790 GHz to 5.810 GHz. For example, the oscillation frequency controller 163 sequentially changes the oscillation frequency to 5.79175 GHz, 5.79525 GHz, 5.79875 GHz, 5.80225 GHz, 5.80575 GHz, and 5.80925 GHz.

Substantially, a channel signal in 5.7900 GHz to 5.7935 GHz, a channel signal in 5.7935 GHz to 5.7970 GHz, a channel signal in 5.7970 GHz to 5.8005 GHz, a channel signal in 5.8005 GHz to 5.8040 GHz, a channel signal in 5.8040 GHz to 5.8075 GHz, and a channel signal in 5.8075 GHz to 5.8110 GHz are received through each of the minimum passband BPF 131a.

Since the oscillation frequency controller 163 changes each oscillation frequency at a predetermined time interval, a channel signal in a corresponding band may be received and processed at different times. For example, the time interval may be very small, for example, shorter than 10 seconds.

It is preferable that the channel information update unit 161 stores each frequency band and signal intensity by individual channel signal which is detected at the predetermined frequency interval. Here, it is preferable that the switch controller 162 searches the available frequency band with reference to all of the individual channel signals stored in the data table of the channel information update unit 161.

That is, the oscillation frequency controller 163 receives each channel signal by a frequency band corresponding to the minimum passband BPF 131a based on a corresponding oscillation frequency by receiving each of the channel signals at a predetermined frequency interval while changing the oscillation frequency of the local oscillator 121 at a predetermined frequency interval, and enables proper band allocation with reference to all of channel signals received by each frequency band.

After completely detecting a channel occupancy state by sequentially changing the oscillation frequency through the oscillation frequency controller 163, it is preferable that the oscillation frequency controller 163 selects a designated oscillation frequency (FC) to transmit and receive information.

As described above, it is preferable to perform the same band allocation in the CPE 100b corresponding to the BS 100a at the same time of performing band allocation in the BS 100a.

The CPE 100b may operate as a client for the BS 100a. For example, the CPE 100b may be a base station or the CPE 100b may be a terminal communicating with the BS 100a.

That is, it is preferable that transmission bands of the BS 100a and the CPE 100b are the same as shown in FIG. 2. When the BS 100a allocates a transmission frequency band, the CPE 100b simultaneously allocates the same frequency band as follows.

The switch controller 162 of the BS 100a controls the switches 140 to allow information transmission only through the optimal BPF and transmits command information for driving only the optimal BPF to the signal converter 150 of the BS 100a.

At this moment, the signal converter 150 of the BS 100a converts the command information from a digital signal to an analog signal and transmits the converted command information to the BPF unit 130. The BPF unit 130 transmits the command information to the frequency controller 120 through the selected BPF.

The selected BPF may be the minimum band BPF which is used when the channel occupancy state is detected through received the channel signal, or the optimal BPF selected through the control of the switch controller 162 based on the analyzing result of the received channel signals. The selected BPF may be one of the minimum band BPF and the optimal BPF according to an application time.

The frequency converter 120 of the BS 100a frequency up-converts the command information received through the BPF unit 130 to a WiMAX transmission band using the local oscillator 121 and transmits the up-converted command information to the antenna 110.

The antenna 110 of the BS 100a wirelessly transmits the command information to the CPE 100b which is a client system at a remote location. Here, the CPE 100b identically includes the antenna 110, the frequency converter 120, the BPF unit 130, the switches 140, the signal converter 150, and the processor 160.

That is, the antenna 110 of the CPE 100b receives the command information from the BS 100a, the frequency converter 120 down-converts the received command information, and the down-converted command information passes through a selected one of a plurality of BPFs 131a to 131d included in the BPF unit 130. Then, the signal converter 150 converts the command information from the analog signal to the digital signal and transmits it to the processor 160.

The processor 160 of the CPE 100b controls the switch unit 140 and the signal converter 150 of the CPE 100b by receiving and decoding the command information in order to enable the CPE 100b to transmit and receive information only through the optimal BPF corresponding to the command information.

Hereinafter, the dynamic bandwidth allocation method according to an embodiment of the present invention will be described in more detail with reference to FIG. 3.

At first, the BS 100a monitors a spectrum state at a current location of the BS 100a, which is a channel occupancy state, before the BS 100a transmits predetermined information such as multimedia information or a control signal to the CPE 100b.

In order to monitor the channel occupancy state, the BS 100a sequentially receives channel signals of oscillation frequencies from the antenna 100 while changing an oscillation frequency in an entire target service frequency band at a predetermined frequency interval. For example, the entire target service frequency band is about 20 MHz from a center frequency of 5.8 GHz, and the predetermined frequency interval is about 3.5 MHz which is a bandwidth of a BPF 131a having the minimum passband. Then, the received channel signals are sequentially down-converted through the frequency converter 120.

The switch controller 162 in the processor 160 opens only a transmission path of the minimum band BPF 131a by controlling the switches 140 so as to receive each of the channel signals only through the minimum band BPF 131a while receiving the channel signals for detecting the channel occupancy state.

Such a channel signal receiving operation may be equivalent to wideband spectrum sensing time of FIG. 3.

Each of the down-converted channel signals is analyzed in the processor 160 in the BS 100a. The processor 160 searches an available frequency band which is not occupied by the channel signals. Then, the processor 160 controls the switches 140 to transmit and receive information only through one selected optimal BPF of BPFs 131a to 131d, which passes the available frequency band, and controls the signal converter 150 to generate a sampling clock corresponding to the optimal BPF at the same time.

Here, the channel information update unit 161 in the processor 160 updates the data table of the channel information update unit 161 by storing channel signals each having intensity larger than a predetermined threshold among the received channel signals. Such an operation is equivalent to Table update in FIG. 3. Here, the switch controller 162 searches an available frequency band which is not occupied by each of the received channel signals with reference to the updated frequency bands and signal intensities in the data table and controls the switches 140 to drive only an optimal BPF corresponding to the searched available frequency band.

At the same time, the BS 100a transmits command information to the CPE 100b through the signal converter 150, the BPF unit 130, the frequency converter 120, and the antenna 110 in order to control the CPE 100b to transmit and receive information only through the optimal BPF. Here, the BS 100a wirelessly communicates with the CPE 100b. It may be equivalent to Control Signals in FIG. 3. Here, the information is transmitted using a minimum band BPF of a predetermined channel, for example, 3.5 MHz.

Then, the CPE 100b receives the command information through the antenna 110, the frequency converter 120, the BPF unit 130, the signal converter 150, and the processor 160. The switch controller 162 and the sampling clock selector 164 in the processor 160 control the switch unit 140 and the signal converter 150 of the CPE 100b using the received command information, respectively.

Therefore, the switch unit 140 of the CPE 100b opens the transmission path of the optimal BPF among the plurality of BPFs 131a to 131d and closes the transmission paths of the others, thereby controlling the signal converter 150 of the CPE 100b or thereby controlling a sampling clock to be generated corresponding to the optimal BPF.

After completely controlling, the CPE 100b may transmit a completion signal to the BS 100a in order to inform of the completion of the dynamic band allocation.

After the BS 100a receives the completion signal from the CPE 100b, the BS 100a can begin transmitting the information which is a target service to provide. It may be equivalent to Service flow setup of FIG. 3.

That is, after performing the dynamic band allocation at the BS 100a and the CPE 100b according to the current channel occupancy state sensed at the installation location by monitoring the channel signals which may be interference signals, the BS 100a can provide a service by transmitting the target information to service through the processor 160, the signal converter 150, the selected optimal BPF of the BPF unit 130, the frequency converter 120, and the antenna 110. Here, the CPE 110b also transmits the information to the BS 100a based on the same method. Such an operation may be equivalent to Service Time of FIG. 3.

It is preferable that the dynamic band allocation operation is performed during a service period where the information is transmitted in order to flexibly deal with variable channel environment.

That is, the dynamic band allocation operation can be performed by changing the oscillation frequency of the local oscillator 121 and monitoring the channel occupancy state at the same time.

Channel information is updated by detecting the channel occupancy state while changing the oscillation frequency of the local oscillator 121 using a period having no information while transmitting information or during a pause period that interrupts the transmission of information for a predetermined time such as several seconds. The dynamic band allocation operation is performed based on the updated channel information. It may be equivalent to Spectrum Sensing Time & Table Update of FIG. 3.

As described above, the dynamic bandwidth allocation system according to the present invention can perform dynamic band allocation that guarantees the maximum efficiency by replaying a conventional control module for fixed band allocation to a control module for dynamic band allocation, that is, by including a plurality of BPFs. The dynamic bandwidth allocation system according to the present invention can be also applied not only to a stationary system but also a mobile system such as a portable terminal and a terminal installed at a subway. Also, it is convenience to produce and to maintenance related devices because of a digitalized control mechanism.

Also, the dynamic bandwidth allocation system according to the present invention may be used to monitor transmission efficiency variation and characteristic by interacting with spectrum observing devices.

Furthermore, it is expected that the dynamic bandwidth allocation system according to the present invention will become a tool for preoccupying a world market not only in a mobile phone market but also in WiBro/WiMAX fields.

Moreover, a developed dynamic band allocation board part can be applied to all fields of a wireless communication system as well as a WiBro relay network system and a WiBro/WiMAX system. Therefore, it is expected that the dynamic bandwidth allocation system according to the present invention will take the lead as competitive equipment and will be widely exported as equipment having superior features against foreign equipment.

While the present invention has been described with respect to the specific embodiments, it will be apparent to those skilled in the art that various changes and modifications may be made without departing from the spirit and scope of the invention as defined in the following claims.

The invention claimed is:

1. A dynamic bandwidth allocation system of wireless broadband (WiBro)/worldwide interoperability for microwave access (WiMAX), comprising:
   an antenna for receiving channel signals sensed at an installation location of the dynamic bandwidth allocation system before providing a service of transmitting predetermined information;
   a frequency converter for performing frequency down conversion on the channel signals from the antenna using a local oscillator that operates in a WiMAX transmission band;
   a band pass filter unit having a plurality of band pass filters each having a different frequency passband for passing the channel signals from the frequency converter;
   a signal converter for performing analog to digital conversion on the channel signals from the band pass filter unit;
   a switch unit for controlling the plurality of band pass filters to select one of the plurality of band pass filters in order to pass the channel signals only through the selected one of the plurality of band pass filters; and
   a processor for searching an available frequency band which is not occupied by the channel signals by analyzing the channel signal from the signal converter, and controlling the switch unit to transmit and receive the information through an optimal band pass filter that is a band pass selected from the plurality of band pass filters, which can pass the available frequency band;
   wherein the processor includes:
   a channel information update unit for storing a frequency band and a signal intensity of a channel signal in a data table if an intensity of the channel signal from the selected band pass filter is larger than a predetermined threshold;
   a switch controller for searching the available frequency band based on the channel signal stored in the database of the channel information update unit, and controlling the switch unit to transmit and receive information only through the optimal band pass filter;
   a sampling clock selector for changing a sampling clock of the signal converter corresponding to a passband of the optimal band pass filter at the same time of controlling the switch unit in order to transmit and receive the information after sampling the information by the sampling clock corresponding to the passband of the optimal band pass filter; and
   an oscillation frequency controller for changing an oscillation frequency of the local oscillator by a predetermined frequency interval where the predetermined frequency interval is a bandwidth of a minimum band pass filter which is a band pass filter having a narrowest passband among the plurality of band pass filter, the channel information update unit stores frequency bands and signal intensities of channel signals detected at the predetermined frequency interval in the data table, and the switch controller searches the available frequency band with reference to all of the channel signals stored in the data table of the channel information update unit.

2. The dynamic bandwidth allocation system of claim 1, wherein the switch controller controls the switch unit to receive the channel signal only through the minimum band pass filter while receiving the channel signals.

3. The dynamic bandwidth allocation system of claim 2, wherein the switch controller transmits command information to the signal converter to drive the optimal band pass filter only,
   the signal converter performs digital to analog conversion (DAC) on the command information and transmits the converted command information to the BPF unit,
   the band pass filter unit transmits the command information to the frequency converter through the selected band pass filter,
   the frequency converter converts the command information to a WiMAX transmission band through frequency up conversion using the local oscillator and transmits the converted command information to the antenna,
   the antenna wirelessly transmits the command information to a client system at a remote location, where the client system includes the antennal, the frequency converter, the BPF unit, the switch unit, the signal converter, and the processor, and
   the processor of the client system controls the switch unit and the signal converter of the client system to transmit and receive the information only through the optimal band pass filter corresponding to the command information.

4. The dynamic bandwidth allocation system of claim 1, wherein the processor further includes an oscillation frequency controller for changing an oscillation frequency of the local oscillator by a predetermined frequency interval where the predetermined frequency interval is a bandwidth of a minimum band pass filter which is a band pass filter having a narrowest passband among the plurality of band pass filter,
   the channel information update unit stores frequency bands and signal intensities of channel signals detected at the predetermined frequency interval in the data table, and
   the switch controller searches the available frequency band with reference to all of the channel signals stored in the data table of the channel information update unit.

5. The dynamic bandwidth allocation system of claim 4, wherein the switch controller controls the switch unit to receive the channel signal only through the minimum band pass filter while receiving the channel signals.

6. The dynamic bandwidth allocation system of claim 5, wherein the switch controller transmits command information to the signal converter to drive the optimal band pass filter only,
   the signal converter performs digital to analog conversion (DAC) on the command information and transmits the converted command information to the BPF unit,
   the band pass filter unit transmits the command information to the frequency converter through the selected band pass filter,
   the frequency converter converts the command information to a WiMAX transmission band through frequency up conversion using the local oscillator and transmits the converted command information to the antenna, the antenna wirelessly transmits the command information to a client system at a remote location, where the client system includes the antenna, the frequency converter, the BPF unit, the switch unit, the signal converter, and the processor, and the processor of the client system controls the switch unit and the signal converter of the client system to transmit and receive the information only through the optimal band pass filter corresponding to the command information.

* * * * *